US009346583B2

(12) United States Patent
Ness

(10) Patent No.: US 9,346,583 B2
(45) Date of Patent: May 24, 2016

(54) RACK CONSTRUCTION

(71) Applicant: Tom Gurtner, New Orleans, LA (US)

(72) Inventor: Daniel Ness, Metairie, LA (US)

(*) Notice: Subject to any disclaimer, the term of this patent is extended or adjusted under 35 U.S.C. 154(b) by 224 days.

(21) Appl. No.: 14/061,392

(22) Filed: Oct. 23, 2013

(65) Prior Publication Data
US 2014/0109992 A1    Apr. 24, 2014

Related U.S. Application Data

(60) Provisional application No. 61/717,489, filed on Oct. 23, 2012.

(51) Int. Cl.
| F16L 3/00 | (2006.01) |
| B65D 88/00 | (2006.01) |
| B65D 25/24 | (2006.01) |
| B65D 90/12 | (2006.01) |
| A47G 29/00 | (2006.01) |
| B65D 19/02 | (2006.01) |
| B65D 19/38 | (2006.01) |
| B65D 19/44 | (2006.01) |
| B65D 19/08 | (2006.01) |
| B60P 3/22 | (2006.01) |
| B65D 19/06 | (2006.01) |
| B65D 88/54 | (2006.01) |

(52) U.S. Cl.
CPC .............. *B65D 19/02* (2013.01); *B65D 19/385* (2013.01); *B65D 19/44* (2013.01); *B60P 3/22* (2013.01); *B60P 3/2205* (2013.01); *B60P 3/2215* (2013.01); *B65D 19/06* (2013.01); *B65D 19/08* (2013.01); *B65D 88/54* (2013.01); *B65D 2519/00975* (2013.01); *Y10T 137/7039* (2015.04)

(58) Field of Classification Search
CPC ........ B65D 19/02; B65D 19/06; B65D 19/08; B65D 19/385; B65D 88/54; B60P 3/22; B60P 3/2215; B60P 3/2205
USPC ................... 137/376; 220/1.5, 628, 629, 630; 211/71.01
See application file for complete search history.

(56) References Cited

U.S. PATENT DOCUMENTS

| 2,579,655 A | 12/1951 | Donald |
| 2,683,010 A | 7/1954 | Hamerslag, Jr. |

(Continued)

OTHER PUBLICATIONS

International Search Report for PCT/US2013/066402, Feb. 27, 2014.

*Primary Examiner* — John K Fristoe, Jr.
*Assistant Examiner* — Kelsey Rohman
(74) *Attorney, Agent, or Firm* — Garvey, Smith, Nehrbass & North, L.L.C.; Charles C. Garvey, Jr.; Vanessa M. D'Souza

(57) ABSTRACT

A cargo rack includes a frame having a front, a rear, and upper and lower end portions. The lower end portion has a base with a floor providing a load holding position. A tank module that is supported with the frame during use, the lower end portion of the tank module resting upon the load holding position of the base. The frame includes a plurality of side walls that attach to and extend upwardly from the base frame. Each side wall has a pair of corner columns, a central plate, and a plurality of diagonal members, each diagonal member connected to a corner column and a central plate. The frame can include at least one horizontally extending beam connecting between each pair of corner columns. The diagonal members include an upper pair that can form an obtuse angle and a lower pair that can form an acute angle.

21 Claims, 8 Drawing Sheets

(56) References Cited

U.S. PATENT DOCUMENTS

| | | |
|---|---|---|
| 3,776,435 A | 12/1973 | Smith |
| 3,916,803 A | 11/1975 | Garcia |
| 4,098,426 A * | 7/1978 | Gerhard .................. 220/1.5 |
| 4,165,806 A | 8/1979 | Cayton |
| 4,403,556 A | 9/1983 | Van Gompel |
| 4,828,311 A | 5/1989 | Hayashi |
| 5,078,415 A | 1/1992 | Goral |
| 5,156,233 A | 10/1992 | Olsen et al. |
| 5,292,012 A | 3/1994 | Davis et al. |
| 5,507,237 A | 4/1996 | Barrow et al. |
| 5,906,165 A | 5/1999 | McCorkle, Jr. et al. |
| 6,058,852 A | 5/2000 | Estvanko |
| 6,357,365 B1 | 3/2002 | Higgins et al. |
| 6,371,299 B1 | 4/2002 | Essary |
| 6,422,405 B1 | 7/2002 | Haenzel |
| 6,668,735 B2 | 12/2003 | Cassina |
| 6,725,783 B2 | 4/2004 | Sekino |
| 6,983,704 B1 | 1/2006 | Ness |
| 7,552,687 B1 | 6/2009 | Ness |
| 7,997,214 B1 | 8/2011 | Ness |
| 2004/0195072 A1 * | 10/2004 | Warlow et al. ............ 198/314 |

\* cited by examiner

RACK CONSTRUCTION

CROSS-REFERENCE TO RELATED APPLICATIONS

This is a nonprovisional patent application of U.S. Provisional Patent Application Ser. No. 61/717,489, filed 23 Oct. 2012, which is hereby incorporated herein by reference.

Priority of U.S. Provisional Patent Application Ser. No. 61/717,489, filed 23 Oct. 2012, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cargo racks for transferring goods between marine vessels and offshore platforms such as oil and gas well drilling and production platforms. More particularly, the present invention relates to an improved cargo rack that enables a user to load the rack with multiple palletized loads (or other loads) and to then transport the entire rack using a lifting device such as a crane or a forklift from the marine vessel to the platform. Additionally, the entire rack can be moved on land or on the platform with a crane or forklift.

2. General Background

In the exploration of oil and gas in a marine environment, fixed, semi submersible, jack up, and other offshore marine platforms are used during drilling operations. Fixed platforms are typically used for production of oil and gas from wells after they have been drilled. Drilling and production require that an enormous amount of supplies be transported from land based storage facilities. Supplies are typically transferred to offshore platforms using very large marine vessels called work boats. These work boats can be in excess of one hundred feet (30.48 meters) in length and have expansive deck areas for carrying cargo that is destined for an offshore platform. Supplies are typically transferred from a land based dock area to the marine vessel using a lifting device such as a crane or a mobile lifting and transport device such as a forklift.

Once a work boat arrives at a selected offshore platform, supplies or products are typically transferred from the deck of the work boat to the platform using a lifting device such as a crane.

Once on the deck of a drilling platform or production platform, space is at a premium. The storage of supplies on an offshore oil well drilling or production platform is a huge problem.

Many cargo transport and lifting devices have been patented. The table below lists some patents that relate generally to pallets, palletized racks, and other cargo racks.

TABLE 1

| PATENT NO. | TITLE | ISSUE DATE MM/DD/YYYY |
|---|---|---|
| 2,579,655 | Collapsible Container | 12-25-1951 |
| 2,683,010 | Pallet and Spacer | 07-06-1954 |

TABLE 1-continued

| PATENT NO. | TITLE | ISSUE DATE MM/DD/YYYY |
|---|---|---|
| 3,776,435 | Pallet | 12-04-1973 |
| 3,916,803 | Loading Platform | 11-14-1975 |
| 4,165,806 | Palletizing System for Produce Cartons and the Like | 08-28-1979 |
| 4,403,556 | Drum Retainer | 09-13-1983 |
| 4,828,311 | Metal Form Pallet | 05-09-1989 |
| 5,078,415 | Mobile Carrier for Gas Cylinders | 01-07-1992 |
| 5,156,233 | Safety Anchor for Use with Slotted Beams | 10-20-1992 |
| 5,292,012 | Tank Handling and Protection Structure | 03-08-1994 |
| 5,507,237 | Lifting Apparatus for Use with Bulk Bags | 04-16-1996 |
| 5,906,165 | Stackable Tray for Plants | 05-25-1999 |
| 6,058,852 | Equipment Skid | 05-09-2000 |
| 6,357,365 | Intermediate Bulk Container Lifting Rack | 03-19-2002 |
| 6,371,299 | Crate Assembly and Improved Method | 04-16-2002 |
| 6,422,405 | Adjustable Dunnage Rack | 07-23-2002 |
| 6,668,735 | Pallet with a Plastic Platform | 12-30-2003 |
| 6,725,783 | Pallet for Stacking Planographic Printing Plates Thereon | 04-27-2004 |

BRIEF SUMMARY OF THE INVENTION

The present invention provides an improved cargo rack apparatus that includes a frame having a front, a rear, and upper and lower end portions.

The lower end portion of the frame provides a structural beam that can preferably include a plurality of beams that are welded end to end to form a generally square or rectangular base.

The base can provide a pair of open-ended parallel forklift tine tubes or sockets.

The frame preferably includes a plurality of tubular corner members or columns, a plurality of diagonally extending members, horizontal upper beams or members and plates, each centrally positioned at a side wall plane. The diagonal members connect to the plate at each side or side wall plane.

One embodiment of the apparatus of the present invention includes a cargo rack and fluid holding tank apparatus, comprising: a) a frame having and upper and lower end portions; b) the lower end portion of the frame having a base with a floor providing a load holding position; c) a tank module that is supported with the frame during use; d) the frame including a plurality of side walls that attach to and extend upwardly from the base, the frame having four corners with a corner column at each corner; e) at least one horizontally extending beam connecting between each pair of corner columns; f) each side wall comprising a pair of said columns, a central plate, and a plurality of diagonal members, each connected to a corner column and a central plate; and g) wherein the diagonal members include an upper pair and a lower pair, the upper pair forming a first angle and the lower pair forming a second angle that is not equal to the first angle.

In another embodiment of the apparatus of the present invention, one of the angles is an obtuse angle.

In another embodiment of the apparatus of the present invention one of the angles is an acute angle.

In another embodiment of the apparatus of the present invention, the first angle is an obtuse angle.

In another embodiment of the apparatus of the present invention, the second angle is an acute angle.

In another embodiment of the apparatus of the present invention, the apparatus further comprises a plurality of fittings that each fit a corner of the tank next to the tank upper surface, each fitting being compressed against the tank with a tensioning member that connects the fitting to the said frame.

In another embodiment of the apparatus of the present invention, there are a pair of tensioning members.

In another embodiment of the apparatus of the present invention, there are a pair of tensioning members and each tensioning member attaches to a said diagonal member.

In another embodiment of the apparatus of the present invention, there are a pair of said tensioning members and each tensioning member attaches to a different diagonal member.

In another embodiment of the apparatus of the present invention, the tensioning members form an angle that is less than 180 degrees.

In another embodiment of the apparatus of the present invention, each corner column has an upper end portion with a lifting eye that enables a lifting device such as a crane to lift the frame.

Another embodiment of the apparatus of the present invention includes a rack for shipping a contained fluid, comprising: a) a frame having a plurality of sides and upper and lower end portions; b) the lower end portion of the frame having a base with a floor providing a load holding position; c) a tank module that is supported with the frame during use; d) the frame including a plurality of side walls that attach to and extend upwardly from the base, the frame having four corners with a corner column at each corner; e) each side wall comprising a pair of said columns, a central plate, and a plurality of diagonal members, each connected to a corner column and a central plate; and f) wherein the diagonal members include an upper pair and a lower pair, the upper pair forming a first angle and the lower pair forming a second angle that is not equal to the first angle; and g) a plurality of fittings that each fit a corner of the tank next to the tank upper surface, each fitting being compressed against the tank with a tensioning member that connects the fitting to the said frame.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
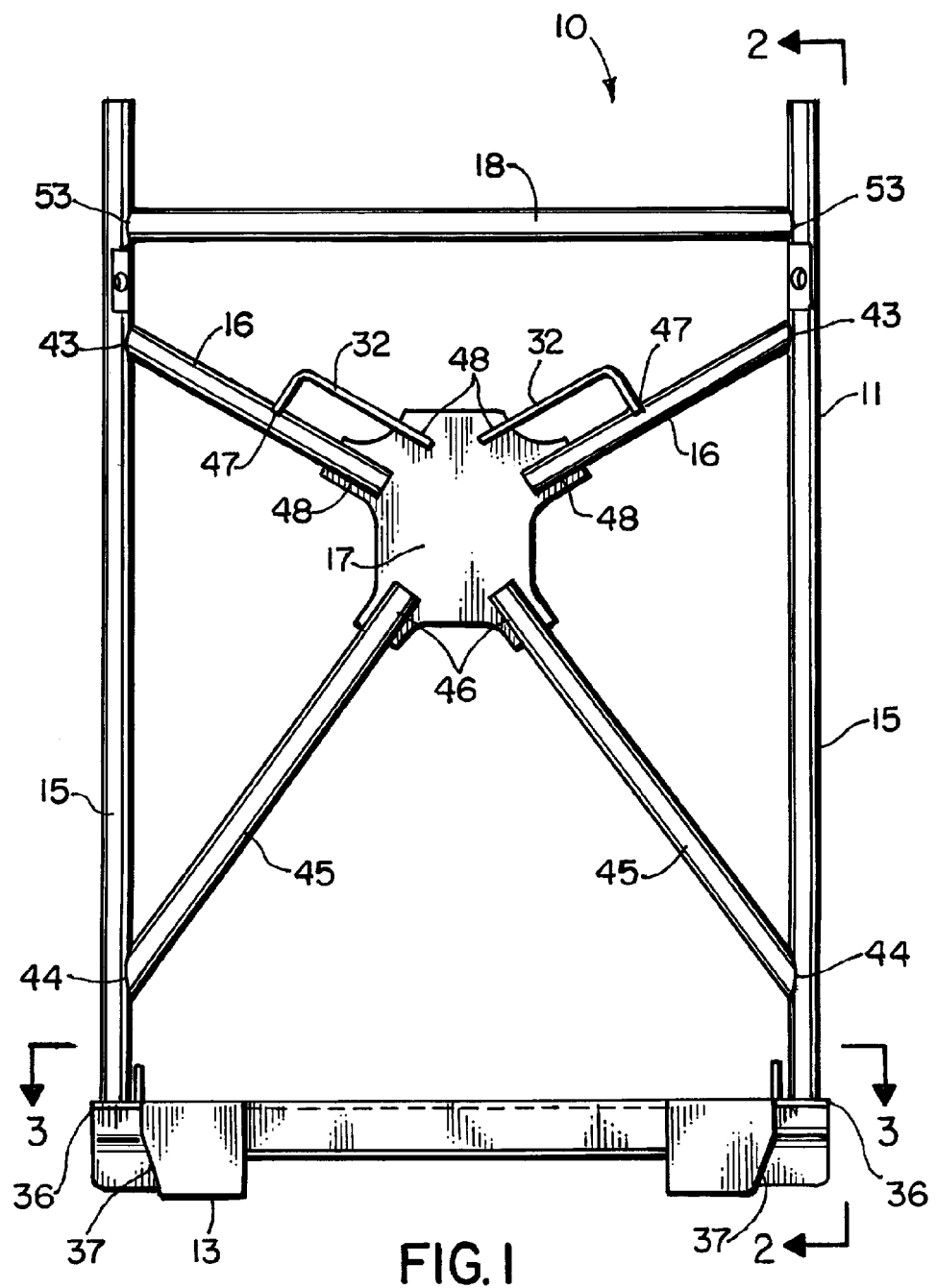
FIG. 1 is a side elevation view of a preferred embodiment of the apparatus of the present invention.

FIGS. 1-11 show the preferred embodiment of the apparatus of the present invention designated generally by the numeral 10 in FIGS. 1, 2, 3, 6, 7, and 11. The rack and fluid holding tank apparatus 10 of the present invention provides a frame 11 that holds a tank or vessel 12 (see FIGS. 4 and 6-11). The tank or vessel 12 can be a tote tank having an interior for containing a liquid product that is to be transported, such as to or from a marine oil/gas well drilling or production platform. The tank 12 can be a commercially available tote tank. The tank 12 can provide a plurality of sides or side walls 40, tank top panel 41, tank bottom panel 42, a plurality of tank corners 23 and a tank cover 19 that is used to close an opening or manway in top panel 41. Tank 12 can provide a manway, opening and fittings that enable entry into the tank for cleaning purposes. Tank 12 can be equipped with other fittings that enable fluid to be added to or discharged from the tank 12.

Frame 11 has a base 13 that can be provided with spaced apart fork lift sockets 14. Frame 11 provides four corner posts 15 and a plurality of diagonal members 16, 45. Each upper diagonal member 16, is welded to a corner post 15 at weld 43 and to plate 17 at weld or welds 48. Each lower diagonal member 45 is welded to post 15 at weld 44 and to plate 17 at weld 46 (see FIG. 1).

Diagonal members 16 are upper diagonal members. Diagonal members 45 are lower diagonal members. Each diagonal member 16, 45 is welded (e.g., mitre weld at 43 or 44) to a corner post 15 and to plate 17 at weld or welds 46 or 48.

The frame 11 can provide a plurality of upper horizontal beams 18 above upper diagonal members 16. Each horizontal beam 18 is welded to a pair of corner posts 15 at weld 53. Thus, each upper horizontal beam 18 is welded at one end portion to a corner post 15 and at its opposite end portion to another corner post 15 (see FIG. 1).

Figure 2:
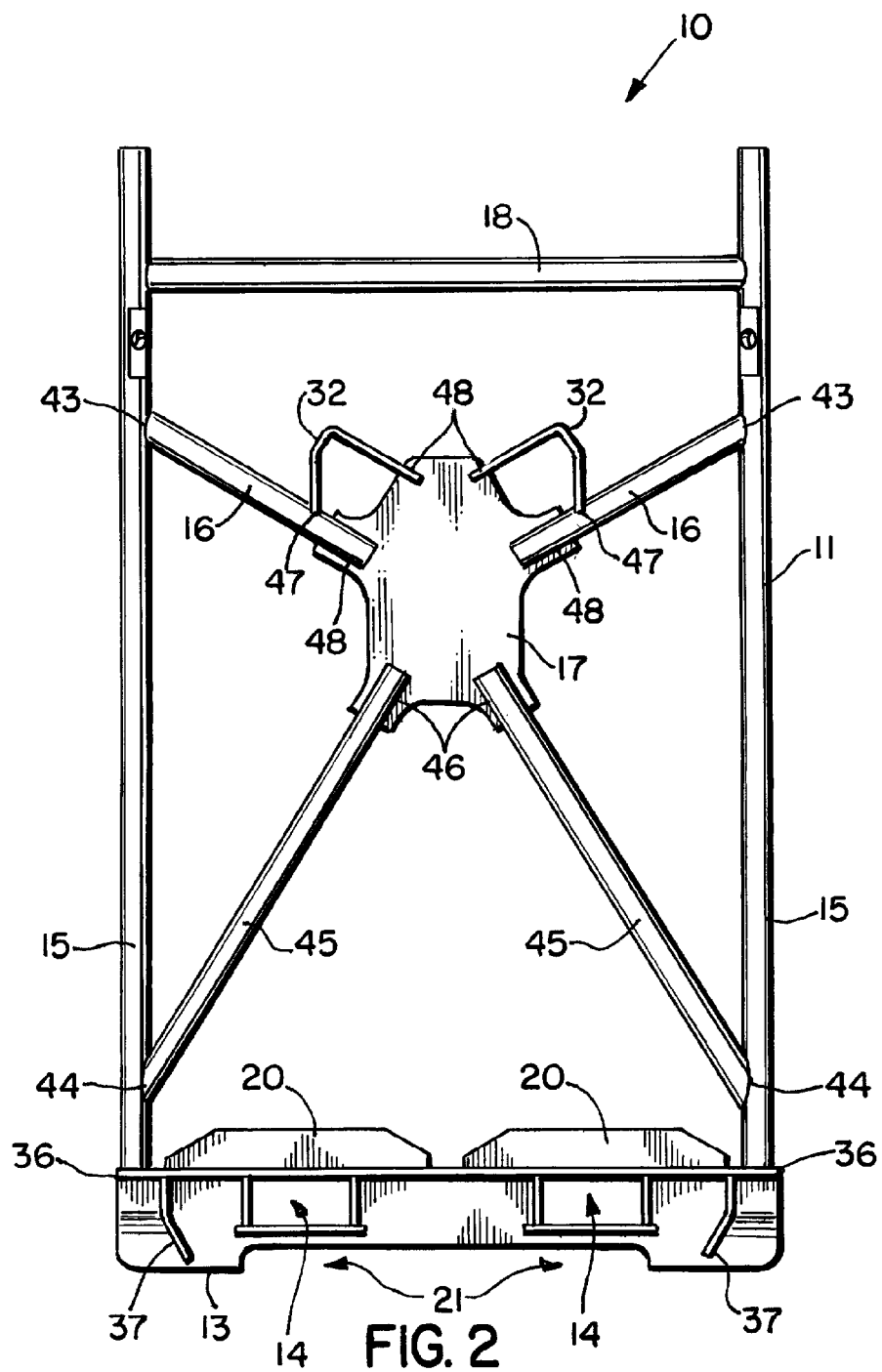
FIG. 2 is a sectional view taken along lines 2-2 of FIG. 1.
Figure 3:
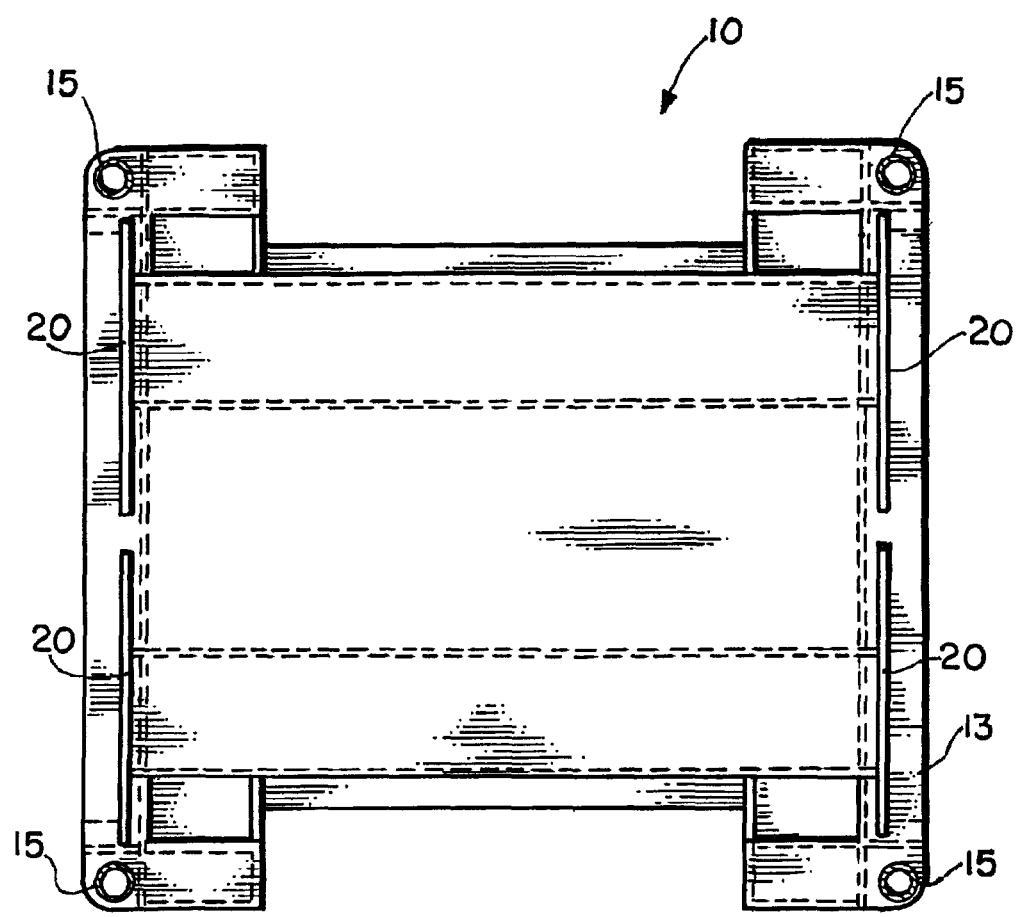
FIG. 3 is a sectional view taken along lines 3-3 of FIG. 1.
Figure 4:
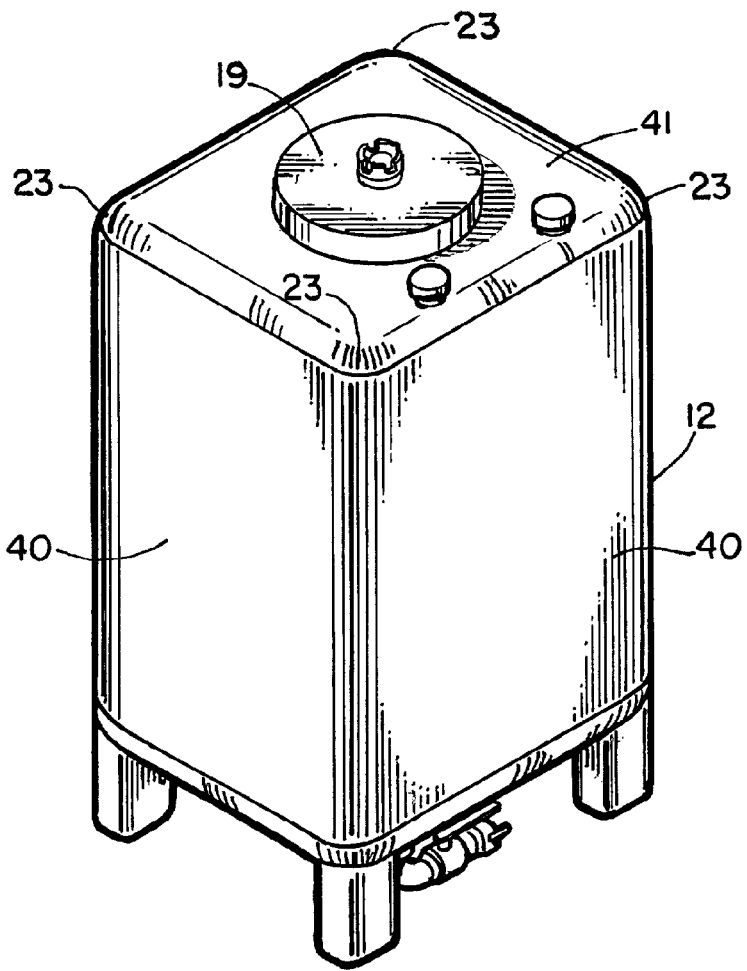
FIG. 4 is a partial perspective view of a preferred embodiment of the apparatus of the present invention illustrating the tank portion.
Figure 11:
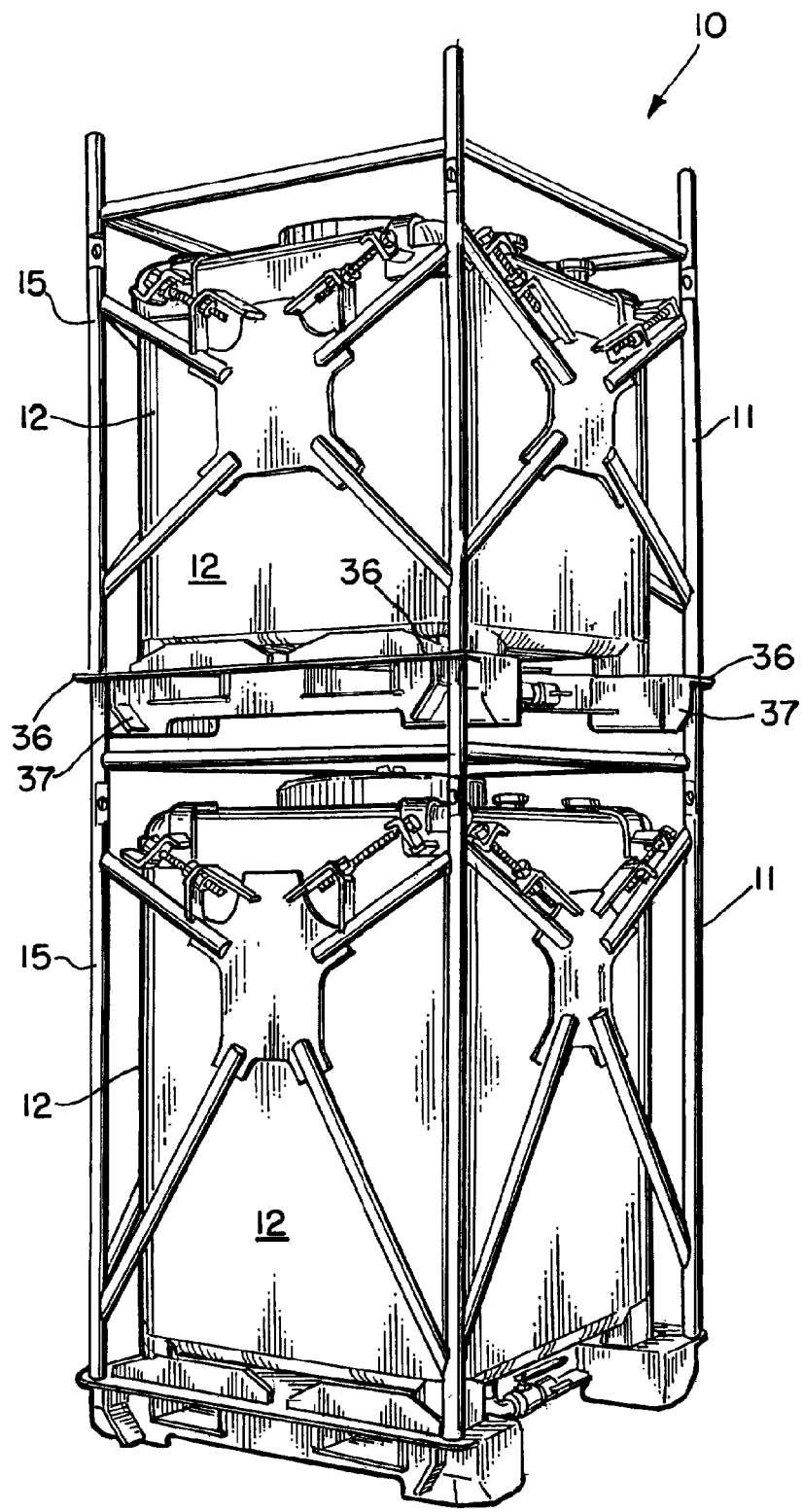
FIG. 11 is an elevation view of a preferred embodiment of the apparatus of the present invention illustrating a stacking of one apparatus upon another.

A plurality of vertical plates 20 (or other projections or fittings) are provided at or near the periphery of base 13 (e.g., welded to base 13) (see FIG. 2). The vertical plates 20 (or other projections or fittings) prevent lateral movement of the tank 12 relative to the frame 11 and base 13. A recess or slot 21 can be provided at the bottom of each side of base 13. Base 13 can be configured to stack upon another frame 11 as shown in FIG. 11.

Base 13 provides a horizontally extending plate or section 36 at the bottom of a post 15 (see FIG. 2). When stacking one apparatus 10 upon another apparatus 10, the top of a post 15 engages the bottom of horizontal section 36 (see FIGS. 9-11). One or more inclined or diagonal plates, fittings or surfaces 37 can be provided to help guide the top of frame 11 and the top of each post 15 into engagement with the underside of horizontal plate or section 36 (see FIGS. 1-2, 6, and 9-11).

An L-shaped bracket 32 is welded to plate 17 and to an upper diagonal member 16. In FIGS. 1 and 2, the brackets 32 can be welded to a diagonal member 16 at weld 47 and to plate 17 at weld 48. There can be two such L-shaped brackets 32 attached to each plate 17 and to the pair of upper diagonal members 16 that are closest to the upper end portion of frame 11 as seen in FIGS. 1 and 2. A specially configured fitting 24 (FIGS. 5-8) can be used to help secure tank 12 to frame 11. The fitting 24 is placed upon a corner 23 of tank 12 at the intersection of the tank upper panel or top panel 41 and a tank sidewall 40 as shown in FIGS. 5-8. Bolts 25 are used to form an attachment of fitting 24 to a pair of the L-shaped brackets 32 as seen in FIGS. 5-8.

Fitting 24 has a pair of S-shaped plates 26. Fitting 24 can be constructed of three curved plates 27, 28 and 29 that are welded together in a shape that corresponds to the shape of a corner 23 at the intersection of sidewalls 40 with top panel 41 (see FIG. 5). The fitting 24 thus closely conforms to the uppermost portion of tank 12 at corner 23 as seen in FIGS. 6 (see arrow 52), 7, and 8. Each fitting 24 has an opening 31 that is receptive of bolt 25. Bolt 25 has a bolt head 49 and externally threaded shaft 50 (see FIG. 5).

Bracket 32 provides flanges 34, 35. The flange 34 has an opening 51 that is receptive of the externally threaded shaft 50 of bolt 25 (see arrow 54, FIG. 6). Bracket nut 33 completes a connection of bolt 25 to L-shaped bracket 32 as seen in FIGS. 5-8.

Bolt 25 that can be tightened to apply tension to fitting 24. A fitting 24 is placed at each upper tank corner 23 as shown in FIGS. 5-8. Each fitting 24 that covers a particular tank corner 23 is tightened by a pair of bolts 25, each bolt 25 pulling diagonally along the line that can be generally parallel to an upper diagonal member 16 (see FIGS. 5-8). The plurality of diagonal members 16, 45 can be provided on each side of frame 11. Each side can be defined by a plane that is co-planer with a plate 17. There are, for example, four sides and four plates 17 of the frame 11 (see FIGS. 1-2, 6-7, 11).

Bolt 25 attaches to fitting 24 at S-shaped plate 26. Plate 26 provides an opening 31 that is receptive of bolt 25. The bolt 25 provides a head 49 that will not pass through the opening 31 (see FIG. 5). The diameter of the opening 31 can be about equal to or slightly larger than the diameter of the threaded shaft 50 of bolt 25.

Figure 5:
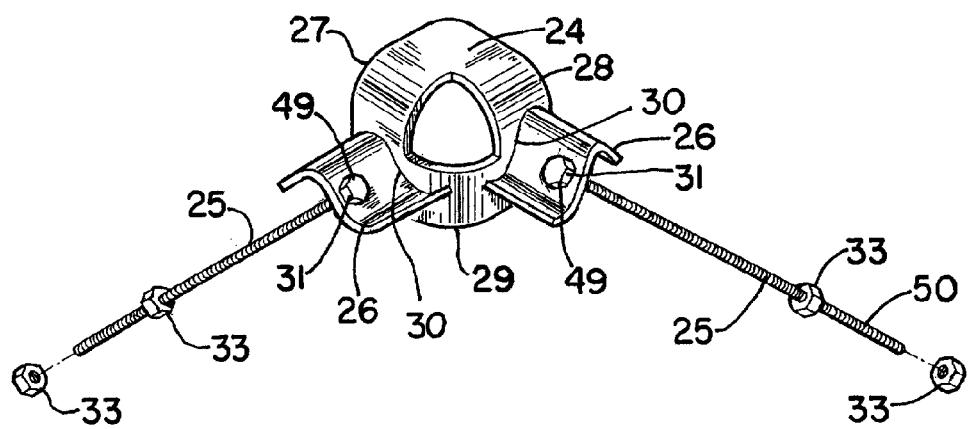
FIG. 5 is a fragmentary perspective view of a preferred embodiment of the apparatus of the present invention.
Figure 6:
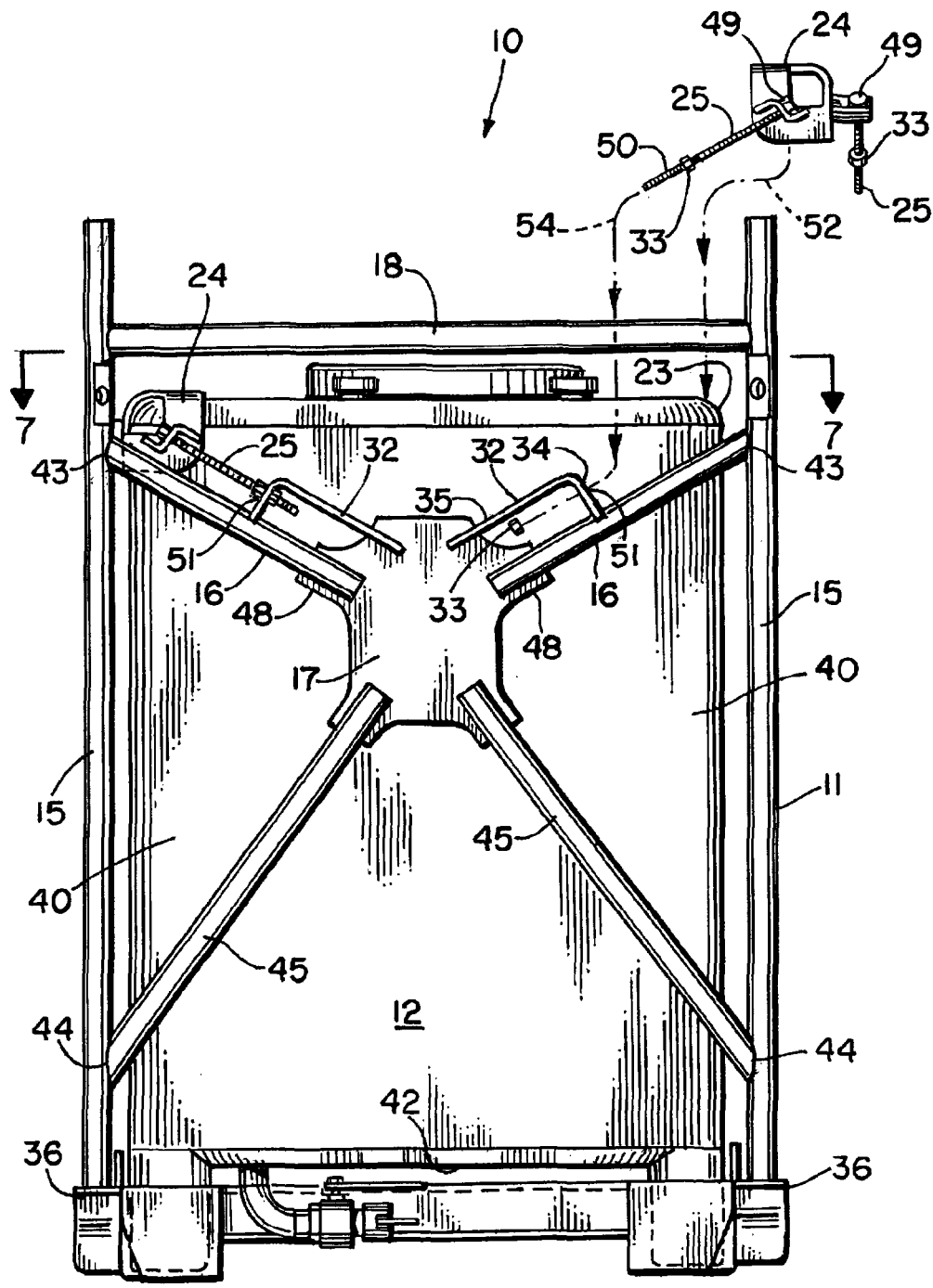
FIG. 6 is a side view of a preferred embodiment of the apparatus of the present invention.
Figure 7:
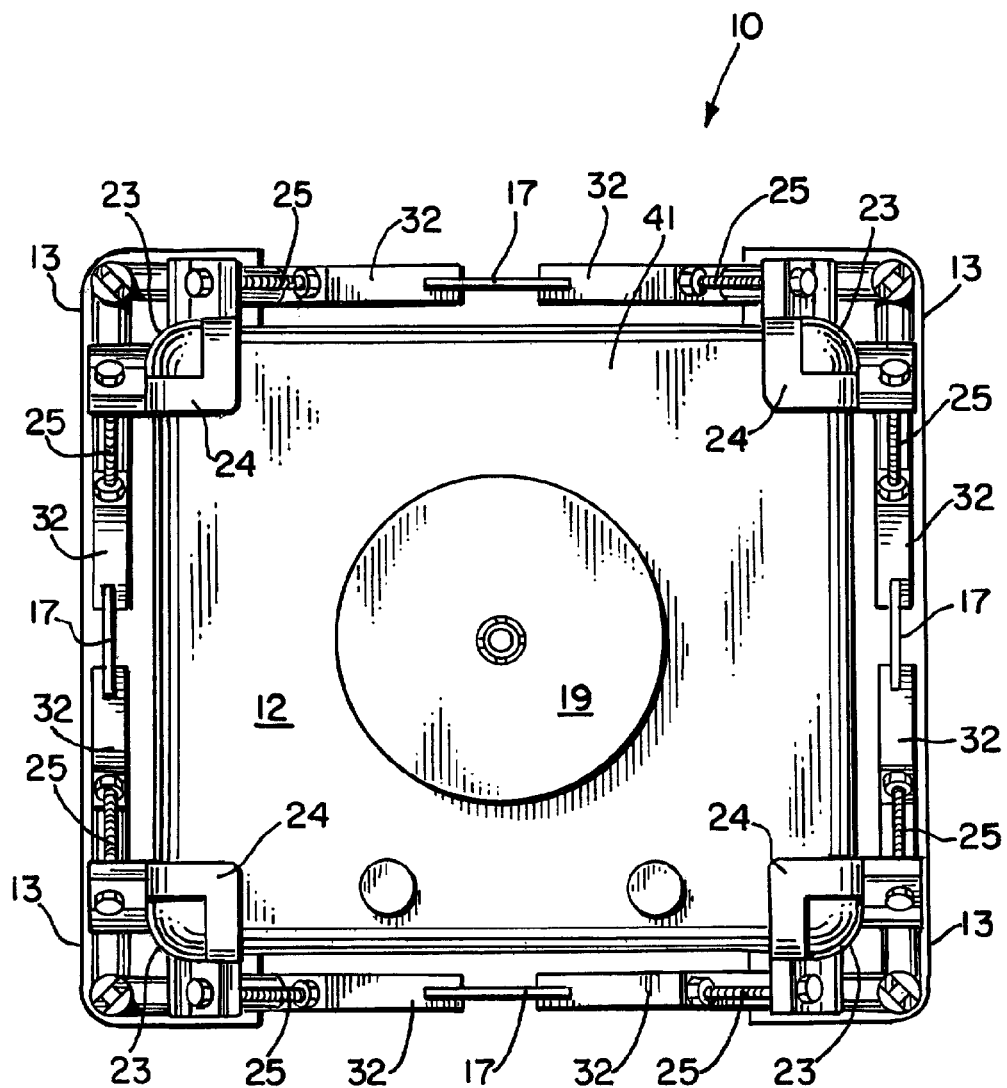
FIG. 7 is a sectional view taken along lines 7-7 of FIG. 6.
Figure 8:
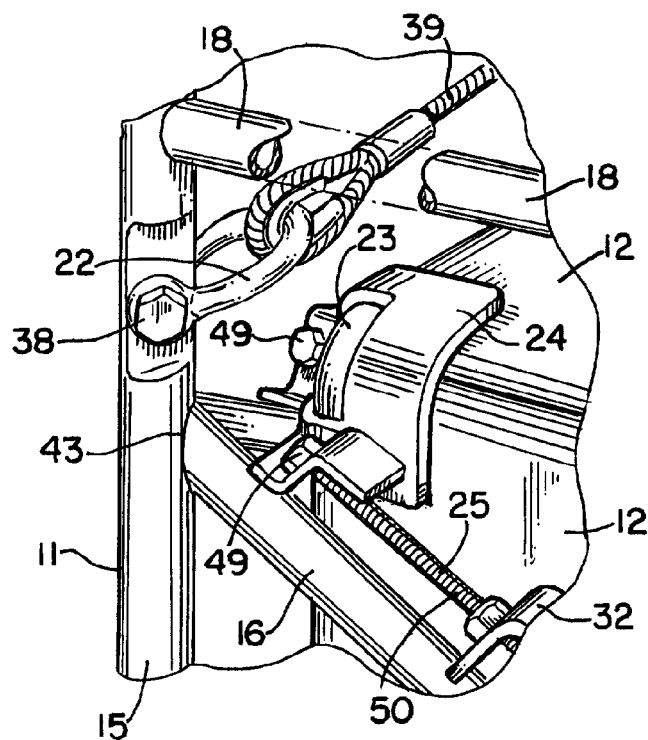
FIG. 8 is a fragmentary perspective view of a preferred embodiment of the apparatus of the present invention.
Figures 9, 10:
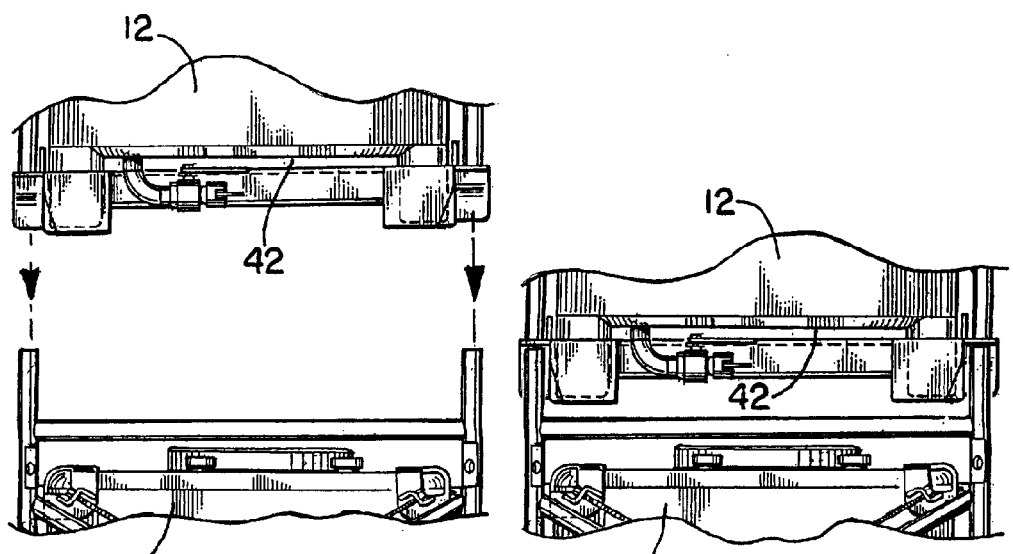
FIG. 9 is an elevation view of a preferred embodiment of the apparatus of the present invention illustrating a stacking of one apparatus upon another.
FIG. 10 is an elevation view of a preferred embodiment of the apparatus of the present invention illustrating a stacking of one apparatus upon another.

Fitting 24 can be of welded curved plates 27, 28 and 29 welded together as best seen in FIG. 5. Fitting 24 can be a stamped or cast part. There are a pair of S-shaped plates 26 attached (e.g., welded at welded connection or weld 30) to each fitting 24. FIG. 5 shows the curved plates 27 and 28 which are connected to fitting 24 (e.g. welded) and that extend somewhat perpendicularly to each other. The plate 29 wraps around the tank corner 23 as shown in FIGS. 5, 7-8. Plate 29 is attached (e.g. welded) to each of the plates 27, 28 as shown.

An opposing end portion of each bolt 25 attaches to bracket 32 with one or more internally threaded nuts 33 (see FIG. 5). Each bracket 32 is attached (for example, welded) to plate 17 and to an upper diagonally extending member 16. The bracket 32 includes flanges 34, 35 that can intersect at about 90 degrees with respect to each other as shown in FIGS. 6, 8. Brackets 32 can be of a different shape as seen in FIG. 2. There is an opening provided in flange 34 that is receptive of bolt 25. Nuts 33 can be fastened to bolt 25 on opposing sides of flange 34 as shown in FIG. 6.

Frame 11 with contained tank or vessel 12 can be lifted using a plurality of slings 39 rigged to frame 11 with shackles 22 (see FIG. 8). Each corner post 15 has a shackle opening 38 that enables connection of a shackle 22 to post 15 at opening 38. Slings 39 are then rigged to the shackles 22. A crane or other lifting implement can then be rigged to the slings using a crown block, hook, or other lifting rigging for enabling a lift of frame 11 and a contained tank 12.

PARTS LIST

| PART NO. | DESCRIPTION |
| --- | --- |
| 10 | rack and tank apparatus |
| 11 | frame |
| 12 | tank or vessel |
| 13 | base |
| 14 | fork lift socket |
| 15 | corner |
| 16 | upper diagonal member |
| 17 | plate |
| 18 | upper horizontal beam |
| 19 | tank cover |
| 20 | vertical plate |
| 21 | recess/slot |
| 22 | shackle |
| 23 | tank corner |
| 24 | fitting |
| 25 | bolt |
| 26 | S-shaped plate |
| 27 | curved plate |
| 28 | curved plate |
| 29 | curved plate |
| 30 | weld/welded connection |
| 31 | opening |
| 32 | bracket |
| 33 | bracket nut |
| 34 | flange |
| 35 | flange |
| 36 | horizontal section |
| 37 | inclined surface |
| 38 | shackle opening |
| 39 | sling |
| 40 | tank side wall |
| 41 | tank top panel |
| 42 | tank bottom panel |
| 43 | weld |
| 44 | weld |
| 45 | lower diagonal member |
| 46 | weld |
| 47 | weld |
| 48 | weld |
| 49 | bolt head |
| 50 | externally threaded shaft |
| 51 | flange opening |
| 52 | arrow |
| 53 | weld |
| 54 | arrow |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A cargo rack and fluid holding tank apparatus, comprising:
 a) a frame having upper and lower end portions;
 b) the lower end portion of the frame having a base with a floor providing a load holding position;
 c) a tank module that is supported with the frame during use, said tank module having four tank upper corners;
 d) the frame including a plurality of side walls that attach to and extend upwardly from the base, the frame having four corners with a corner column at each corner;
 e) at least one horizontally extending beam connecting between each pair of corner columns;
 f) each side wall comprising a pair of said columns, a central plate, and a plurality of diagonal members, each connected to a corner column and a central plate;
 g) wherein the diagonal members include an upper pair and a lower pair, the upper pair forming a first angle and the lower pair forming a second angle that is not equal to the first angle;

h) a plurality of tank corner fittings, each said fitting removably attached to a said tank upper corner; and l) a plurality of tension members that connect between the frame and the tank corner fittings, wherein a pair of said tension members are attached to each fitting.

2. The cargo rack and tank apparatus of claim 1 wherein one of the said angles is an obtuse angle.

3. The cargo rack and tank apparatus of claim 1 wherein one of the said angles is an acute angle.

4. The cargo rack and tank apparatus of claim 1 wherein the first angle is an obtuse angle.

5. The cargo rack and tank apparatus of claim 1 wherein the second angle is an acute angle.

6. The cargo rack and tank apparatus of claim 1 wherein each fitting being compressed against the tank with a said tensioning member that connects the fitting to the said frame.

7. The cargo rack and tank apparatus of claim 6 wherein there are a pair of said tensioning members.

8. The cargo rack and tank apparatus of claim 7 wherein each tensioning member attaches to a said diagonal member.

9. The cargo rack and tank apparatus of claim 7 wherein each tensioning member attaches to a different diagonal member.

10. The cargo rack and tank apparatus of claim 6 the tensioning members form an angle that is less than 180 degrees.

11. The cargo rack and tank apparatus of claim 1 wherein each corner column has an upper end portion with a lifting eye that enables a lifting device such as a crane to lift the frame.

12. A rack for shipping a contained fluid, comprising:

a) a frame having a plurality of sides and upper and lower end portions;

b) the lower end portion of the frame having a base with a floor providing a load holding position;

c) a tank module that is supported with the frame during use;

d) the frame including a plurality of side walls that attach to and extend upwardly from the base, the frame having four corners with a corner column at each corner;

e) each side wall comprising a pair of said columns, a central plate, and a plurality of diagonal members, each connected to a corner column and a central plate; and f) wherein the diagonal members include an upper pair and a lower pair, the upper pair forming a first angle and the lower pair forming a second angle that is not equal to the first angle;

g) a plurality of fittings that each fit a corner of the tank next to the tank upper surface, each fitting being compressed against the tank with a plurality of tensioning members that connect between the fitting and the said frame.

13. The rack of claim 12 wherein one of the said angles is an obtuse angle.

14. The rack of claim 12 wherein one of the said angles is an acute angle.

15. The rack of claim 12 wherein the first angle is an obtuse angle.

16. The rack of claim 12 wherein the second angle is an acute angle.

17. The rack of claim 12 wherein each fitting is compressed against the tank with a tensioning member that connects the fitting to the said frame next to the central plate.

18. The rack of claim 17 wherein a pair of said tensioning members extends downwardly from a said fitting.

19. The rack of claim 18 wherein each tensioning member attaches to a said diagonal member.

20. The rack of claim 18 wherein each tensioning member attaches to a different diagonal member.

21. The rack of claim 18 wherein each pair of the tensioning members attached to a fitting form an angle that is less than 180 degrees.

* * * * *